United States Patent [19]

Walker et al.

[11] 4,156,964

[45] Jun. 5, 1979

[54] COIL PLACING MACHINE WITH STACK HEIGHT ADJUSTMENT

[75] Inventors: Robert G. Walker, Ossian; Andrew K. Anspach, Bluffton, both of Ind.

[73] Assignee: Industra Products, Inc., Fort Wayne, Ind.

[21] Appl. No.: 889,200

[22] Filed: Mar. 23, 1978

[51] Int. Cl.² .......................................... H02K 15/10
[52] U.S. Cl. ........................................ 29/734; 29/736
[58] Field of Search ................ 29/734, 736, 732, 596; 140/1

[56] References Cited

U.S. PATENT DOCUMENTS

| | | | |
|---|---|---|---|
| 3,722,063 | 3/1973 | Arnold | 29/734 |
| 3,828,830 | 8/1974 | Hill et al. | 29/732 X |
| 3,829,953 | 8/1974 | Laner et al. | 29/734 |

*Primary Examiner*—Carl E. Hall
*Attorney, Agent, or Firm*—Gust, Irish, Jeffers & Rickert

[57] ABSTRACT

A fast set up tooling arrangement for a coil placing machine is disclosed wherein the finger elements or blades which support coils as well as a magnetic core into which the coils are to be placed, as well as the reciprocable ram actuated stripper which is movable along those finger elements to engage and move coils into the magnetic core are readily adjustable axially of the machine to accommodate changes in the height of the magnetic core or stack. The arms which grip the core and the length of insulating wedges to be placed in the core may also be adjustable. The axial extent of the finger elements or tooling blades as well as the axial distance traveled by the stripper are simultaneously adjusted by imparting a relative rotary motion between the stripper and finger elements on the one hand and a finger support shaft and stripper actuating ram on the other hand with the respective rotated and fixed elements being threadingly interconnected.

To effect stack height adjustment the stripper and its actuating ram are moved to their extended position at which a key interlocks the stripper actuating ram and a threaded finger support shaft to prevent relative rotation therebetween. The stripper and finger elements are also interlocked in this position and in one embodiment a driven gear arrangement engages and rotates the actuating ram and threaded finger support shaft to move threadingly mated second stripper engaging ram portion and a threaded finger holder having the finger elements disposed about its periphery.

26 Claims, 13 Drawing Figures

COIL PLACING MACHINE WITH STACK HEIGHT ADJUSTMENT

BACKGROUND OF THE INVENTION

The present invention relates generally to the insertion of prewound coils in magnetic cores and more especially to the insertion of such prewound coils in dynamoelectric machine stator cores. More particularly, the present invention relates to a method and apparatus for the insertion of such prewound coils which is readily adapted to varying magnetic core dimensions.

A number of machines have been devised for inserting prewound coils, as well as, optionally, insulating wedges into stator cores. One such coil placing machine is illustrated in the Hill U.S. Pat. No. 3,324,536. In the Hill device, as in the present invention, preformed coils, for example formed on winding machines of a known type, are placed over appropriate tooling blades or fingers of the placer for subsequent insertion into a stator. The coils for all of the poles of the machine to be produced may be placed on the tooling blades and if desired auxiliary or start windings, as well as main windings, may be placed on the blades and inserted into the stator core by but a single axial pass of a stripper along the blades to engage and urge those windings into and partially through the stator core. Various insulating wedges may be inserted into the stator core slots, either to separate windings or to isolate the windings from the stator bore, and such insertion processes may be effected in a single stage operation or in several stages as desired.

The above-mentioned Hill coil placing machine provides for rather rudimentary modifications to accommodate stators of different stack height. To maintain the end turns of the coils at a reasonable minimum when they are positioned in a stator, and of course to accommodate a given coil within the stator for which it is designed, the finger elements or blades should extend about to or just beyond the stator end face and similarly the maximum extension or travel of the stripper through the stator bore should be at most only slightly beyond that necessary to place the windings into the stator. To obviate these potential problems when changing from one stack height to another, the Hill machine provides for the insertion of tubular spacers of a preselected length in conjunction with a certain amount of lost motion in the connection between a stripper actuating ram and the stripper so that the length of the stroke taken by the stripper is appropriate to the particular axial length of the stator being then provided with windings. Similarly, the Hill device provides for adjustment movement of the finger elements or blades and also of so-called wedge guide members by loosening a plurality of screws which hold those fingers and wedge guides in place and this type operation amounts to the individual repositioning or removal of the pertaining blades and guides. While effective, this blade and wedge guide adjustment process was sufficiently time consuming and difficult that an arrangement for simultaneously gripping and moving the blades when the screws were loosened was devised and is disclosed in the Walker et al U.S. Pat. No. 3,402,462.

There have been further attempts to simplify the process of accommodating such a coil placing machine to operate on stators of varying stack height. For example, adjustment of the blades or finger elements by using a centrally tapped blade holder and a threaded tooling shaft, rotatable by a wrench, have been used in several versions with U.S. Pat. No. 3,698,063 being exemplary of such approaches. Typically, the stripper must be removed to allow access by the wrench to make the adjustment.

Also, special machines, for example as illustrated in U.S. Pat. No. 3,829,953, have been designated to achieve multiple adjustments simultaneously. The exemplary patented device employs a chain driven set of variable height control surfaces and an axial stripper drive shaft including a slip clutch connection. This exemplary device varies the height of the stator clamping arms, wedge length, the stroke of the stripper, and the tooling blade axial extent. The approach of this last-mentioned exemplary patented device is not easily adaptable to the vast number of machines already in the field and is rather costly in its implementation.

SUMMARY OF THE INVENTION

Among the several objects of the present invention may be noted the provision of an improved coil placing machine and an improved method of adjusting or accommodating a coil placing machine to varying stator stack heights; the provision of an arrangement for the simultaneous adjustment of the stator and coil supporting fingers and the stripper of a coil placing machine; the provision of a coil placing machine having means effective in the extended stripper position only for mechanically coupling a finger support shaft and the stripper actuating ram together to prevent relative rotation therebetween; the provision of a coil placing machine according to the previous object further having means for imparting a relative rotary motion between the stripper and finger elements, and the finger support shaft and stripper actuating ram to adjust the machine to accommodate varying stack height stators; the provision of alternative arrangements for effecting the last-mentioned relative rotary motion by either a gear fixedly attached to and rotatable with the stripper actuating ram, or the tooling index gear found on existing equipment which when the stripper is in its retracted position, indexes the stripper and finger elements together about a common axis; and the provision of a process for adapting a coil placing machine to accommodate various magnetic core sizes. These, as well as other objects and advantageous features of the present invention will be in part apparent and in part pointed out hereinafter.

In general, modification of a coil placing machine is achieved by axially extending the machine ram and stripper to interlock the ram and a finger support shaft to prevent relative rotation therebetween and imparting relative angular movement between the ram and finger support shaft on the one hand, and the stripper and finger elements on the other hand, to axially displace the stripper and the finger elements.

Also in general, and in one form of the invention, when the stripper of a coil placing machine is in a retracted position, the simultaneous rotation of the stripper and the plurality of finger elements about a common axis, relative to other parts of the placing machine, maintains the axial location of the stripper and finger elements fixed, while moving the stripper to an extended position and then simultaneously rotating the stripper and the plurality of finger elements about that common axis relative to other of the placing machine parts, increments the axial location of the stripper and the finger elements in unison relative to those other placing machine parts.

Further in general, and in one form of the invention, moving the stripper of a coil placing machine to an extended position and then simultaneously drivingly engaging a first stripper actuating member and a finger element support shaft for imparting thereto simultaneous rotary motion with the stripper being threadingly coupled to the first actuating member and the finger elements being threadingly coupled to the support shaft, imparts to the stripper and finger elements a simultaneous axial motion when the finger elements and stripper are held in a fixed angular position.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting in any manner the scope of the disclosure or the scope of the invention.

DETAILED DESCRIPTION OF THE PREFERRED EMBODIMENTS

Referring now to the drawings in general, a coil placing machine 11 has a plurality of generally parallel upstanding finger elements, such as 13 and 15, supported on a shaft 17, and disposed generally in a circular pattern for supporting coils, such as 19, and a magnetic core, such as 21, into which the coils are to be placed. The coil placing machine has a reciprocable stripper 23, actuable by a ram 25, and movable along the finger elements 13 and 15, to engage and move coils, such as 19, into the magnetic core 21.

In typical operation, the preformed coils, such as 19, are looped over the finger elements, such as 13 and 17, and then stator 21 is placed over the finger elements bottoming on stator wedge guides, such as 27 and 29. A pair of arms, not illustrated, are actuated to engage the top of the stator 21, holding it firmly down on the wedge guides 27 and 29. The ram 25 then is actuated to begin its upward travel along with wedge push rods, such as 31 and 33. These wedge push rods pass through and pick up insulating wedges from the wedge magazine 35, which insulating wedges are forced upwardly between adjacent wedge guides, and into the stator core 21, along with the preformed coils. As the ram 25 moves upwardly, one ram end 37 engages the releasable coupling arrangement 39 in the stripper 23, and after that engagement, stripper 23 moves further upwardly with ram 25 and the wedge push rods, such as 31 and 33, to place the coils and insulating wedges in stator 21. With the coils positioned in the stator, the stripper 23, ram 25 and push rods 31 and 33, begin their downward travel until the stripper 23 engages tooling shaft 17. This engagement urges ring 41 (FIGS. 8 and 8a) upwardly against the force of coil spring 43, disengaging the ram end 37 from the stripper, and allowing the continued retraction of the ram and wedge push rods.

Figure 1:
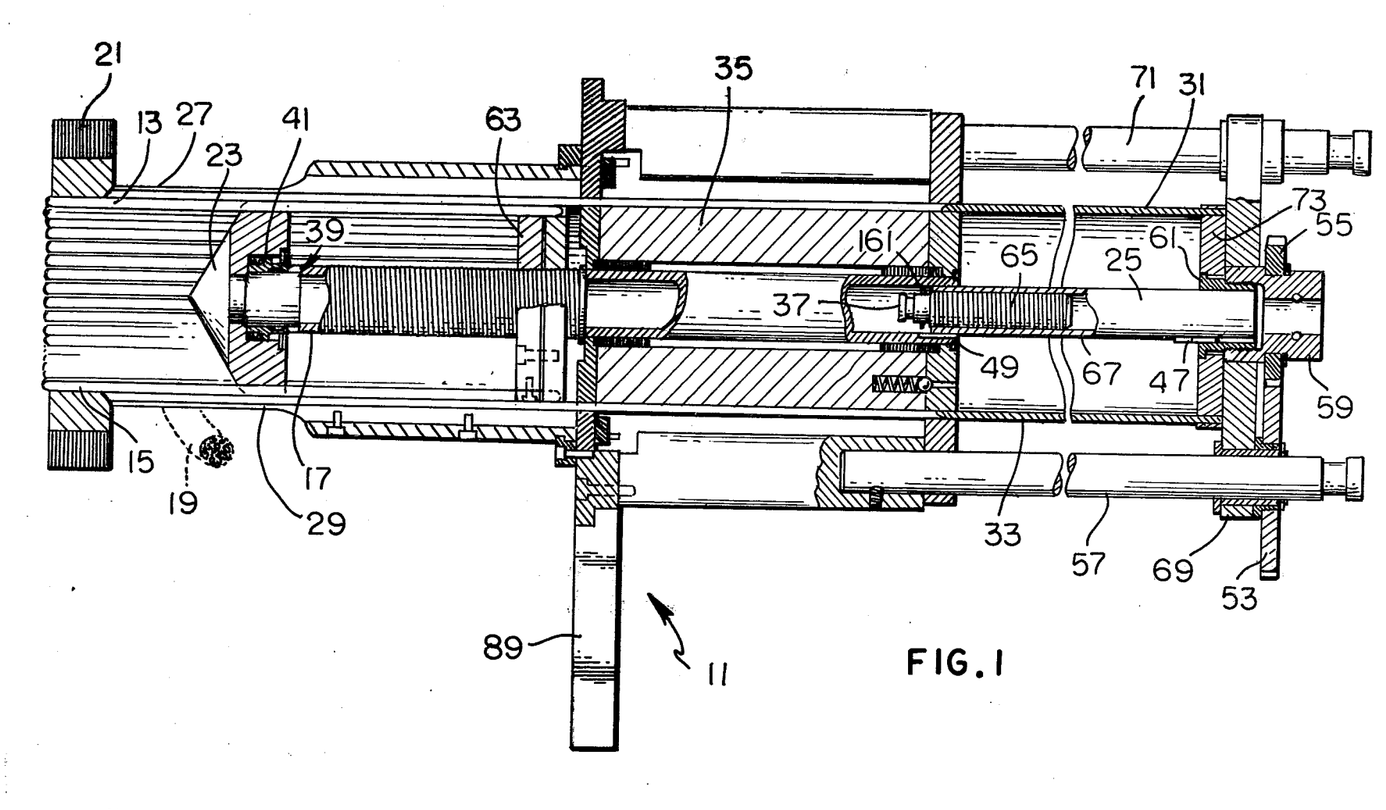
FIG. 1 is a side, primarily sectional view, of the tooling of a coil placing machine in one form of the invention, illustrating the stripper in its retracted position and the stripper and finger elements adjusted for a minimum stack height magnetic core.
Figure 2:
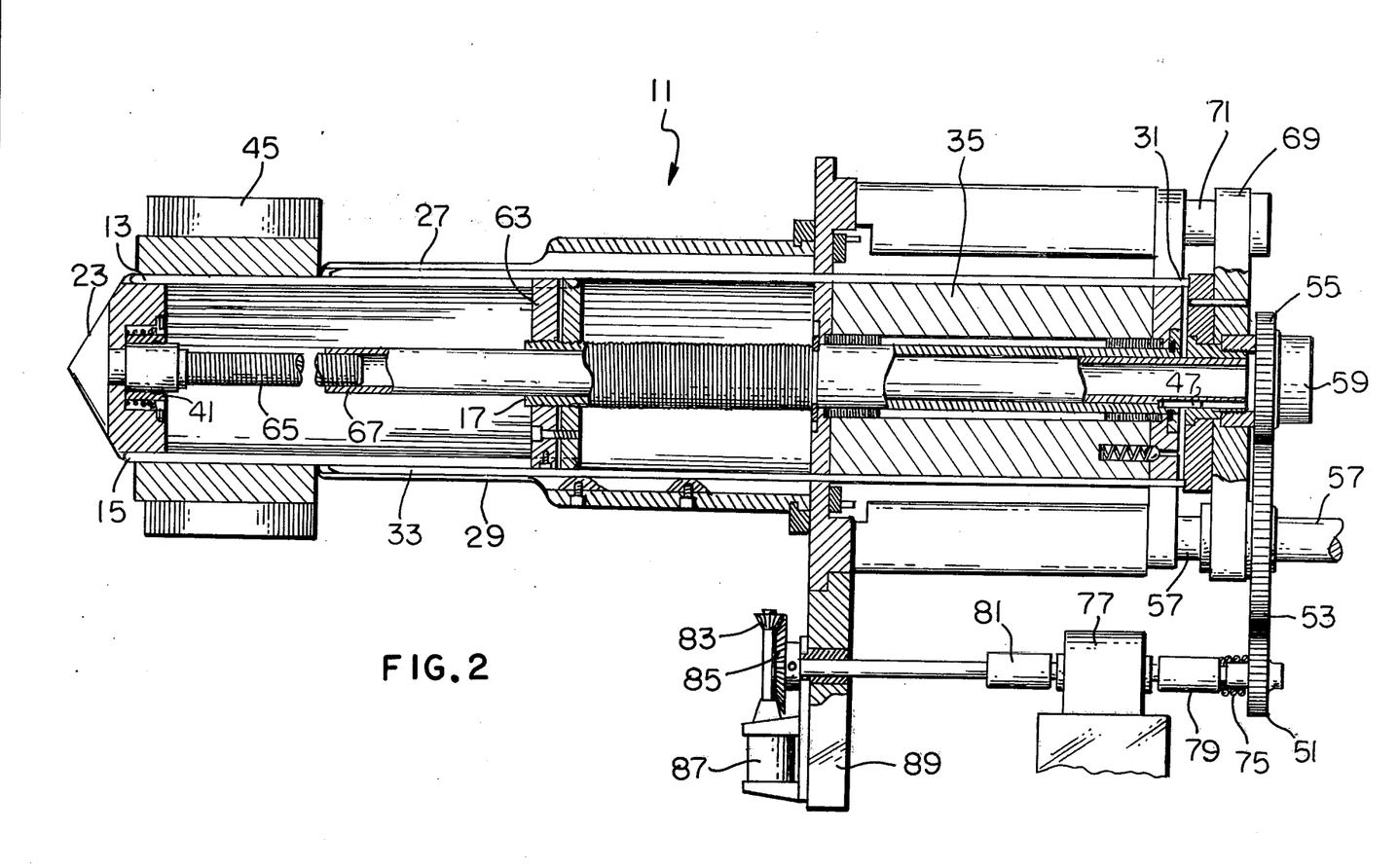
FIG. 2 is a view similar to FIG. 1 but illustrating the stripper extended and the stripper and finger elements adjusted to accommodate a large stack height stator.

Stator 21 may have a stack height of, for example, three-quarters of an inch, whereas the stator 45 of FIG. 2, has a stack height of about six inches. The stator tooling illustrated in FIG. 1 may be adapted for the insertion of coils into the stator 45, according to the techniques of the present invention. Preferably with no coils or stator present, ram 25 is actuated to its extended position with the one ram end 37 interlocking with the releasable coupling 39 in stripper 23, and with means such as the key 47 engaging the finger support shaft 17 at the key accepting slot 49. Thus, the key 47 and slot 49 mechanically couple the finger support shaft 17 and the stripper actuating ram 25 together to prevent relative rotation therebetween. In this raised or extended stripper position with key 47 engaging the keyway 49, an axially fixed gear 51 engages gear 53 which is journaled for rotation about guide rod 57 and is in fixed driving relationship to the gear 55. Rotation of gear 55 causes ram coupling 59, sleeve 61, key 47 and ram 25 to rotate, and due to the engagement of key 47 with slot 49, also causes the tooling shaft 17 to rotate. Since the finger holder or disc 63 is prevented from rotating by the engagement of the finger elements, such as 15, with the wedge guides, such as 29, shaft 17 rotates relative to the finger holder 63, causing axial movement of that holder 63 and the finger elements. Similarly, stripper 23 engages the finger elements, thereby preventing relative rotation of the stripper and finger elements as well as the wedge guides and finger holder. The one ram end 37 is keyed to stripper 23 so as to prevent relative rotation of the second coaxial portion 65 of the ram 25 and hence rotation of the second ram portion 67 when gear 55 is driven causes relative rotation between the two ram portions 65 and 67 extending or retracting the threaded second portion 65 and changing the maximum stripper extension. If the threads on the tooling shaft 17 and the ram portion 65 have the same pitch, driving gear 55 causes the finger elements 15 and the maximum extension of the stripper 23 to change in unison by the same amount, thereby accommodating the coil placing machine for a different stack height stator.

Figures 9, 10:
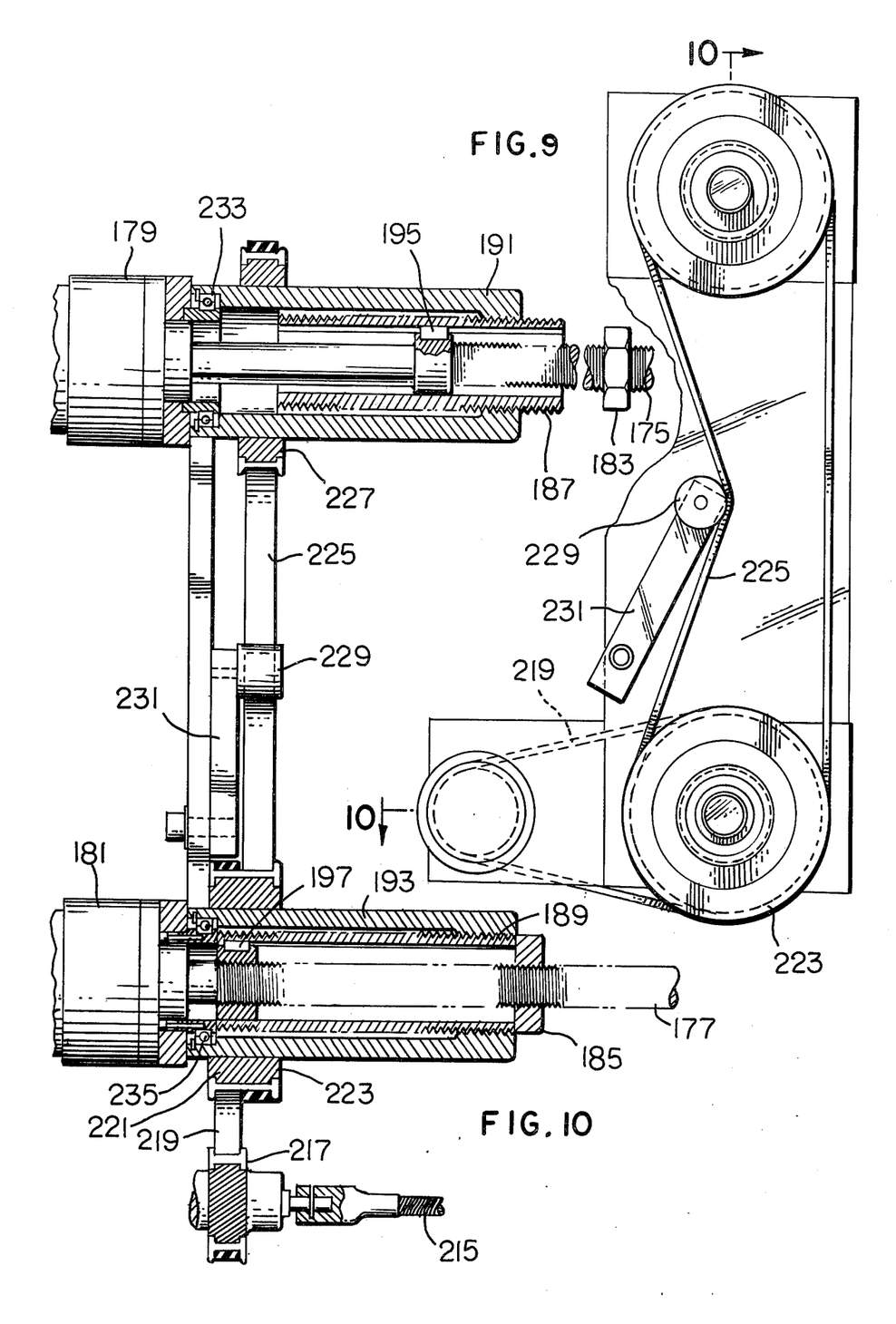
FIG. 9 is a top view of an optional arrangement of core clamp arm stops.
FIG. 10 is a view in section along lines 10—10 of FIG. 9.

In comparing the tooling as it is illustrated in FIGS. 1 and 2, it will be noted that in FIG. 1 the tooling is adjusted for a rather short stack height, whereas the tooling in FIG. 2 is adjusted for a much longer stator. The tooling in FIG. 2 is in the stripper extended position which is the position in which adjustment may occur. The conventional ram driving mechanism in the coil placing machine which causes axial reciprocation of the ram 25, acts through a fixed distance stroke. Thus, the plate 69, which is slidingly journaled to guide rods 57 and 71, has a length of stroke between the position illustrated in FIG. 1 and the position illustrated in FIG. 2, regardless of the stack height of the stator being fabricated. The entire ram 25 also executes this fixed length stroke. The wedge push rods, such as 31 and 33, which are supported about the periphery of a plate 73, also execute a fixed length stroke, so as to move the wedges to be inserted from the wedge magazine 35, into the stator with the end of the wedges which is engaged by the wedge push rods, falling at a fixed location relative to the ends of the wedge guides 27 and 29. Thus, the lower end of the wedge is moved to a fixed location regardless of stator stack height and if the wedge length is appropriately selected (see FIGS. 11 and 12) for the particular stator, proper insulating wedge positioning always occurs. The arms which hold down the stator during the insertion process may be hydraulically actuated and exert a relatively constant pressure on the stator regardless of the stator stack height. No adjustment for varying stator stack height is therefore required for these hold down arms, however, it may be desirable to provide such an adjustment as illustrated in FIGS. 9 and 10.

Stripper 23, however, does not have a fixed length stroke. The retracted stripper position illustrated in FIG. 1 is fixed since the stripper bottoms against tooling shaft 17 when the ram 25 is withdrawn and thereafter the ram end 37 separates from the releasable coupling 39 and the ram continues to retract to the position illustrated in FIG. 1. There is a lost motion between the ram end 37 and the stripper 23 during each cycle of the machine which depends upon the degree to which the ram portion 65 is "unscrewed" from the ram portion 67, and the stripper stroke length plus the length of this lost motion totals the stroke length for the machine.

To change the length of the stripper stroke and to extend or retract the finger elements, and thereby adapt the machine to accommodate magnetic cores of differing sizes, the stripper 23 is moved to an extended position corresponding to the position in FIG. 2, and due to the engagement of key 47 and slot 49, the finger element support shaft 17 and the stripper actuating member 67 are simultaneously drivingly engaged by way of gears 55 and 53 to a gear 51. The stripper 23 is threadingly coupled by way of the second coaxial ram member 65 to the first ram portion 67 and the finger elements 15 are similarly threadingly coupled to the support shaft 17 by way of finger holder 63. Since the finger elements, such as 13 and 15, as well as the stripper 23, are maintained in a fixed angular position, rotation of the gears 51, 53 and 55 imparts simultaneous axial motion to those finger elements and stripper.

When the stripper is in its extended position, as illustrated in FIG. 2, the gears 51 and 53 are meshed. This meshing, as the tooling is extended, may be aided by spring loading gear 51, for example by a coil spring 75. The gear 51 is rotated to adjust the tooling by a drive motor 77 which is connected to gear 51 by way of a sleeve coupling 79, and by way of sleeve coupler 81 is also connected to drive bevel gear 83 by way of ring gear 85, and the bevel gear 83 controls the shaft of an odometer type counter 87. A hand crank arrangement could, of course, be substituted for the drive motor arrangement. This counter 87 may be calibrated to directly read stack height.

Figures 3, 6, 8, 8A:
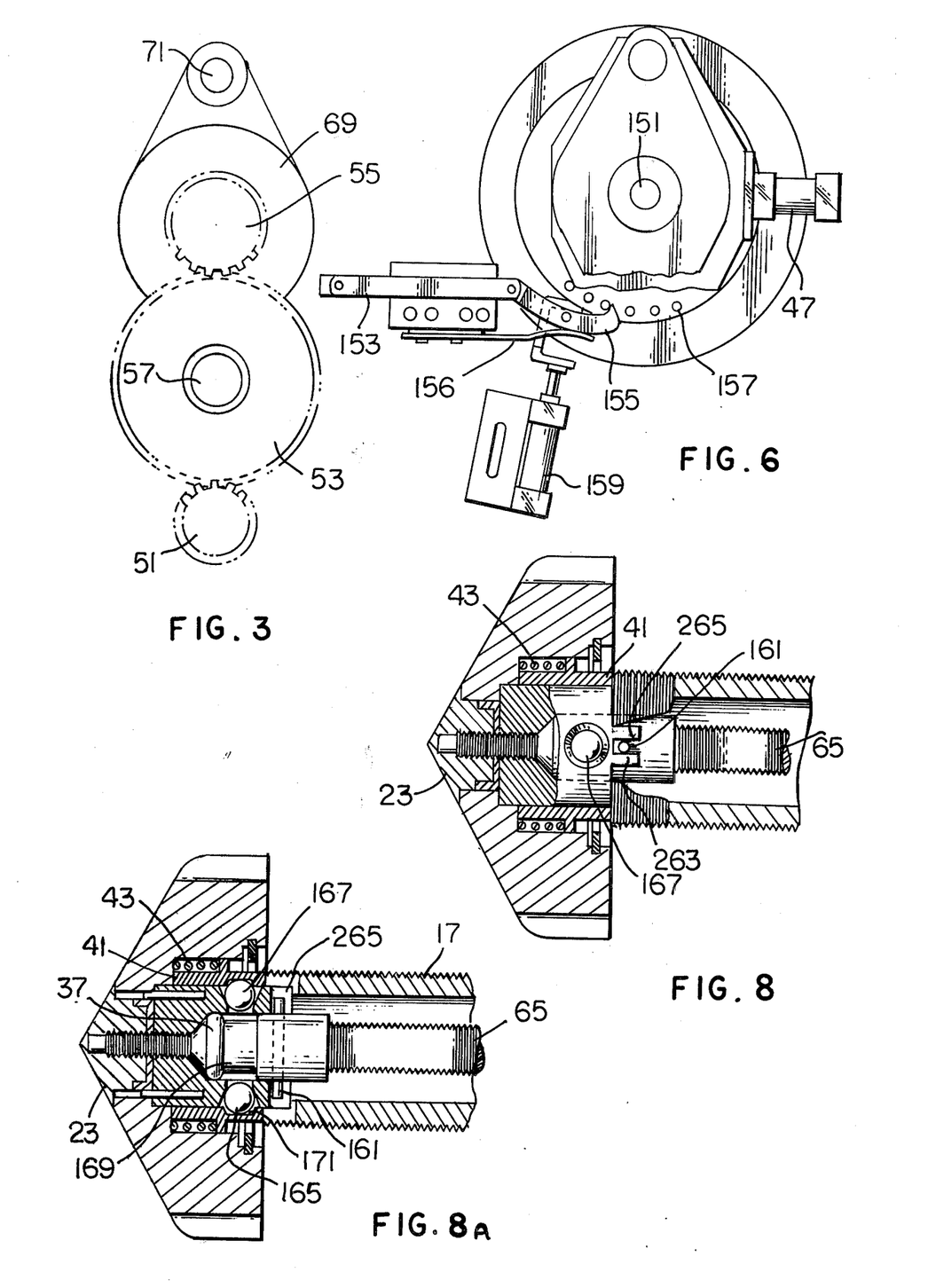
FIG. 3 is a view from the bottom of the tooling arrangement of FIGS. 1 and 2.
FIG. 6 is a bottom view of the tooling of FIGS. 4 and 5.
FIGS. 8 and 8a illustrate a variation on the stripper release mechanism of FIGS. 1, 2, 4 and 5.

In FIGS. 1 through 3, the tooling elements, such as the stripper 23, blades 13 and 15, wedge guides 27 and 29, and other portions of the tooling above the platform 89 of the coil placing machine frame, maintain a fixed angular position. In some coil placing machinery, for example as employed in the Hill et al U.S. Pat. No. Re. 28,087, it is desirable to index or rotate this upper tooling. For example, this may be desirable when the coils for a single machine pole are wound and placed over the appropriate finger elements, whereupon the coils for another machine pole are formed and placed over different finger elements for subsequent simultaneous insertion in a stator core. For example, such tooling would be indexed ninety degrees to sequentially receive the coils for the four main poles of a four pole machine. A coil placing machine having such an indexing feature is illustrated in FIGS. 4 through 7.

Figure 4:
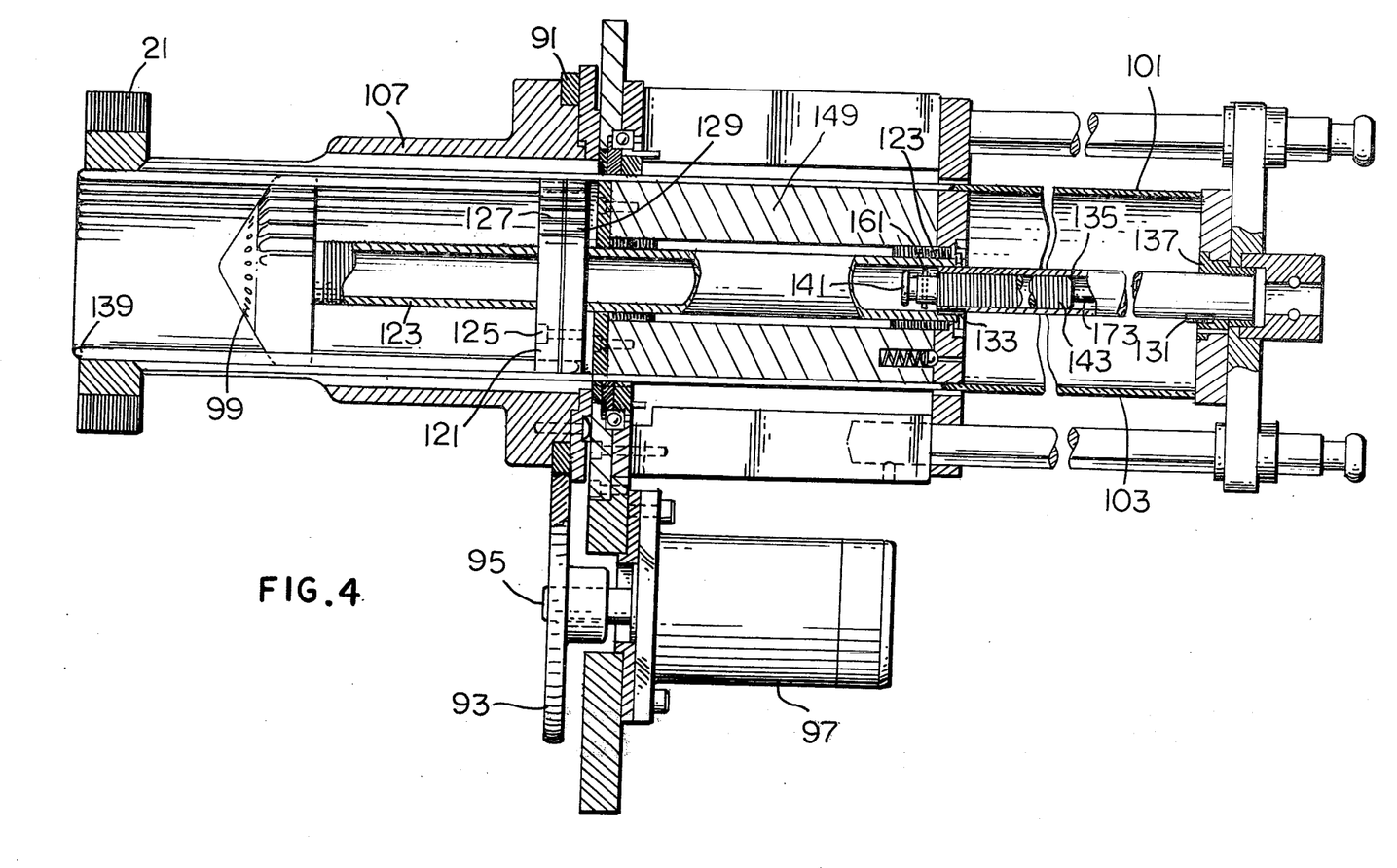
FIG. 4 is a side, primarily sectional view, similar to FIG. 1, but illustrating a modified form of the present invention.

In FIG. 4, indexing of this upper tooling is achieved by driving tooling gear 91 which is in constant mesh with an index drive gear 93, keyed to shaft 95 of a hydraulic motor 97. For the normal indexing of the upper tooling, the stripper 99 and exemplary wedge push rods 101 and 103, are retracted or lowered, and a shot pin 105 (FIG. 7) is withdrawn from the tooling housing 107 by actuating a cylinder 109, freeing this housing for rotation. A bevel gear 111 (FIG. 5) of counter 113 is disengaged from bevel gear 115 by actuation of a further air or hydraulic cylinder 117 so that the counter value which indicates the particular stack height involved does not change during the normal indexing process. The upper tooling may now be rotated as desired and for example the rotating may be stopped by a screw head, such as 108 or 110, appropriately positioned in the tooling housing 107, contacting and actuating an index limit switch 119. Several such screws may be positioned about the tooling housing 107 and when the tooling has completed a full revolution as sensed by limit switch 120, shot pin 105 again engages the tooling housing 107 to hold the tooling in position.

During the normal indexing process, the blade or finger holder 121, and the tooling shaft 123, rotate together so that the blade holder 121 does not move up or down the tooling shaft. To insure sufficient friction between tooling shaft 123 and the blade holder 121, this blade holder is constructed as a two piece arrangement held together by several cap screws, such as 125, with the two holder portions 127 and 129 separated by spring washers associated with each bolt 125. Since both portions 127 and 129 threadingly engage the shaft 123, the friction may be readily adjusted by tightening or loosening the screws 125, introducing a discontinuity in the thread pitch of the blade or finger holder between its two portions and increasing the thread friction.

As the tooling is raised for a coil inserting operation (stripper 99 extended), key 131 engages a slot 133 to lock the ram portion 135 and tooling shaft 123 together, preventing any relative angular motion therebetween. If any accidental misalignment of the key 131 and slot 133 occurs, the key 131 may be pushed downwardly into the ram adapter 137 so as to prevent damage to the apparatus.

To adapt the indexible coil placing machine of FIGS. 4 through 7 to accommodate magnetic cores of differing sizes, the stripper 99 is extended along with the other normally axially moved portions of the machine, with key 131 engaging slot 133, but preferably without stator or windings on the finger elements or blades, such as 139. Raising or extending the ram 135 also engages the end 141 of the other threaded portion 143 of the ram with the stripper in a manner to prevent relative rotation of the threaded portion 143 and stripper 99. At this time then, fingers 139, stripper 99, tooling housing 107, ram portion 143 and the blade holder 121, are all interlocked together to be rotationally driven by the hydraulic motor 97. On the other hand, the ram 135, by way of key 131, is tied together with the tooling shaft 123, both of which are angularly fixed for the adjusting process.

To effect the adjustment with the stripper 99 in its extended position, the operator by actuating a "stack adjust" switch, retracts the shot pin 105, engages the stack adjust counter gears 111 and 115, retracts slot pin 145, due to the actuation of a further hydraulic cylinder 147 to free the wedge magazine 149 for rotation.

In the manufacture of insulating wedges, as described in several of the aforementioned patents, the wedge magazine 149 is sequentially incremented about the machine axis 151 by, for example retracting arm 153, which engages, by way of hook 155, a series of pins 157, with each such pin corresponding to a potential wedge position about a stator. To free the wedge magazine 149, this hook 155 is temporarily retracted against the urging of spring 156 by actuating a cylinder 159. Actuation of the hydraulic motor 97 rotates the tooling housing 107 but with the stripper 99 extended, also causes adjustment of the stripper and finger elements in generally the same manner as described in reference to FIG. 1, however, it should be noted in comparing the two Figs. that the threaded elements which were relatively fixed in FIG. 1, are the same threaded elements which are now rotated in FIG. 4. It should also be noted that in the earlier described embodiment, any axial increment desired could be effected, however, in adjusting the arrangement of FIGS. 4 through 7, a complete revolution of the tooling gear 91 and therefore axial adjustment increments of the reciprocal of the number of threads per inch on either member 143 or the tooling shaft 123 is necessary. Modifications to the equipment are of course possible to eliminate this feature, however, with twenty threads per inch on the mating adjustment members, increments of 0.05 inches in stack height occur and such increments seem adequate for most purposes.

Figure 5:
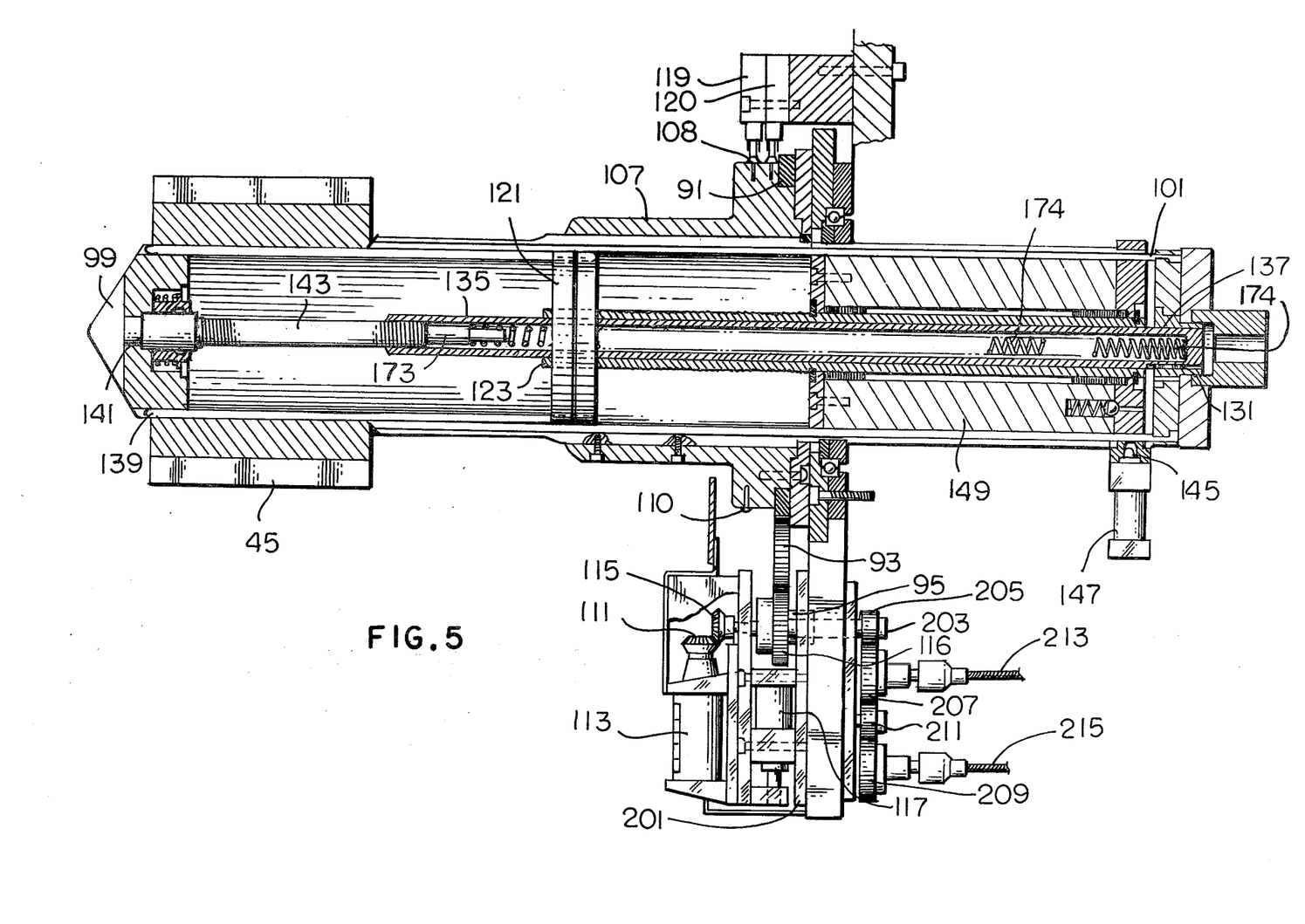
FIG. 5 is a view analogous to FIG. 2 but illustrating the modified form of FIG. 4.

In summary then for the indexible machine illustrated in FIGS. 4 through 7, the stripper may be placed in its retracted position and that stripper 99, along with the plural finger elements, such as 139, may be simultaneously rotated about the machine axis 151, relative to the fixed placing machine parts, and such rotation maintains constant the axial location of the stripper and finger elements. However, moving the stripper to an extended position, as illustrated in FIG. 5, and then simultaneously rotating the stripper and finger elements about the axis, increments the axial location of the stripper and finger elements in unison, relative to the other placing machine parts. A plug 173, for example of Nylon, may be urged against threaded portion 143 by coil spring 174 to increase the friction on the threads to prevent accidental rotation of the threadingly engaged parts in any of the illustrated embodiments.

The details of the pull and release type stripper coupling to the ram for either embodiment is illustrated in FIGS. 8 and 8a. The threaded shaft or ram portion 65 may have a stripper knob key or dowel pin 161 to prevent relative rotation of the shaft 65 and stripper 23, or shaft 65 may be flattened and stripper portion matingly flattened to prevent rotation between the stripper and shaft. As the shaft 65 engages the stripper and moves the stripper away from the tooling shaft 17, sleeve 41 under action of the coil spring 43 forces the balls 165 and 167 toward the shaft and into engagement with the undercut region 169, locking the shaft and stripper together for axial movement as well as preventing their relative rotation. The stripper is unlatched from the shaft only when the sleeve 41 is compressed against spring 43 so as to present the undercut portion 171 to the balls 165 and 167, allowing those balls to move outwardly and release the end 37 of the shaft 65. A pull and release coupling of this general type but lacking the relative rotation preventing feature of the present device is illustrated in FIGS. 19-21 of U.S. Pat. No. 3,828,830.

FIG. 22 of the last-mentioned U.S. Patent illustrates an arrangement for clamping or gripping a stator core during the insertion process. Briefly, the shafts 175 and 177 extend upwardly from the plane of FIG. 7, having jaws or clamping arms near the upper ends thereof, and the shafts may be rotated about their respective axes to pivot the jaws between an out of the way position and a position directly over the stator core. These shafts are also reciprocable between their raised position for pivoting and when disposed above the stator core the shafts and clamping jaws may be lowered to firmly grip the stator for insertion and thereafter raised to be repivoted out of the stator region for placement of a new stator core on the tooling and the other operations precedent to inserting a further set of windings in the new stator core. The clamp arms may optionally be made adjustable along with the tooling length and stripper stroke to accommodate the apparatus for use with varying height stator cores in the manner illustrated in FIGS. 9 and 10.

Figure 7:
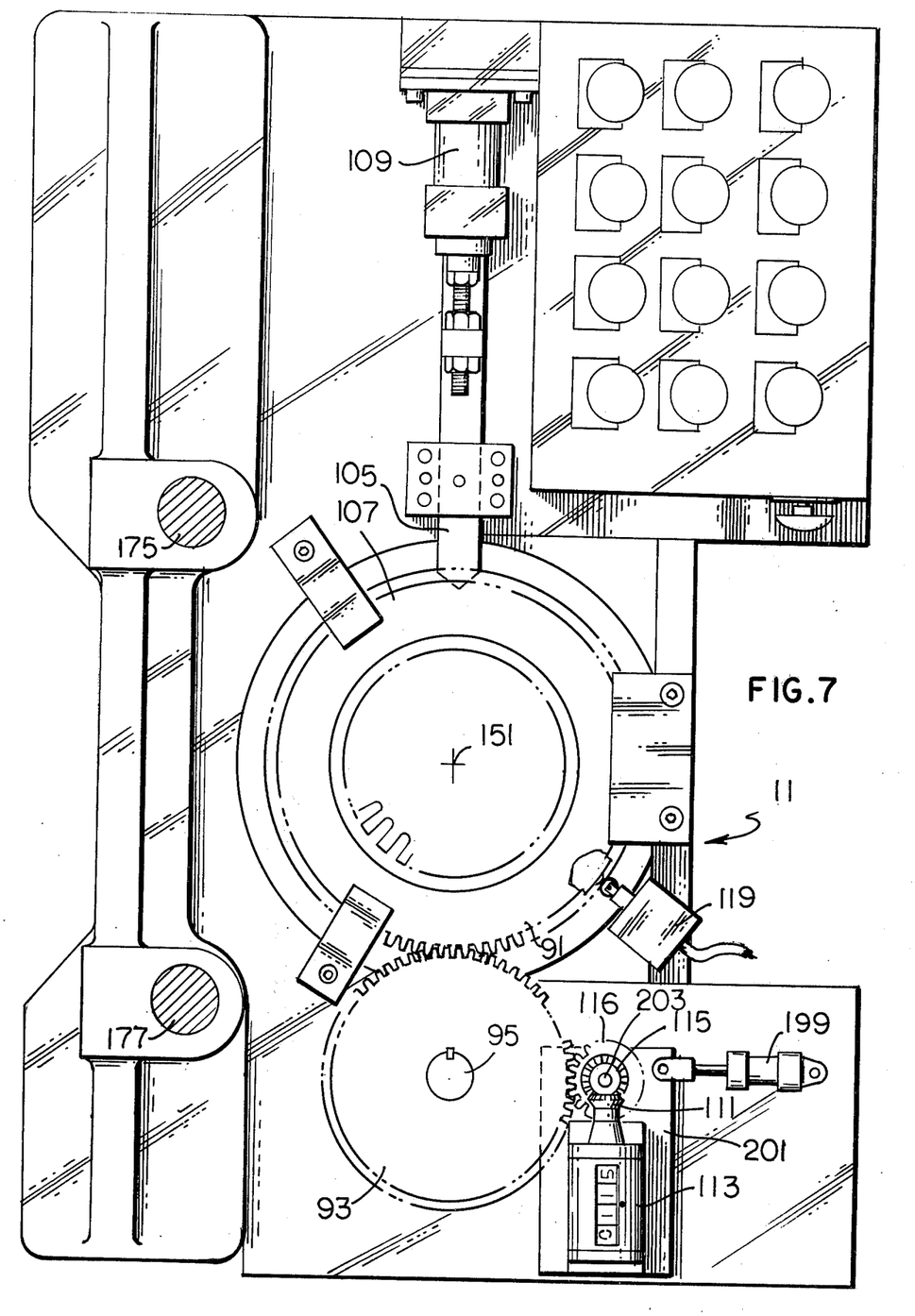
FIG. 7 is a top view of the modified coil placing machine according to FIGS. 4, 5 and 6.

The arrangement illustrated in FIGS. 9 and 10 is disposed beneath the table top surface illustrated in FIG. 7 with shafts 175 and 177 extending therethrough. These two shafts are extended or retracted by actuation of respective air or hydraulic cylinders 179 and 181. Downward travel (in the direction to grip the stator core) is limited by engagement of the nuts 183 and 185 respectively with the threaded sleeves 187 and 189. Upward travel of shafts 175 and 177 may be simply limited by the maximum extension of the respective cylinder pistons or may be otherwise suitably controlled. The outer cylindrical surface of sleeves 187 and 189 are threaded to engage respective threaded inner cylindrical surfaces of sleeves 191 and 193. Rotation of the inner sleeves 187 and 189 is precluded by a key 195 or 197 fixed to slide with their respective shafts 175 and 177 in axially extending keyways interior to the inner sleeves 187 and 189 and therefore also modifies the lower extreme of reciprocation of the clamping arrangement. Modification of the clamping arrangement stop is correlated with modification of the axial displacement imparted to the stripper and finger elements when changing from one stator size to another by a coupling arrangement of timing belts, gears and a flexible shaft.

Returning briefly to FIGS. 5 and 7, it will be recalled that stack height adjustment occurs with the stripper 99 extended when gear 91 is driven to rotate about the inserter axis. Gear 91 drives, by way of gears 93 and 116, a stack height indicator which is engaged or disengaged by cylinder 117 accordingly as the stripper is in its raised stack height adjusting position or its lowered machine indexing position. Provision of an additional cylinder 199 which may supplant cylinder 117 and which engages gears 116 and 93, only while stack height adjustment is occurring, allows gears 116 and 93 to be engaged only during the stack height adjustment process by pivoting the block 201 generally about its lower left-hand corner, as viewed, so that the series of gears beneath the table top are driven by the shaft 203 which is common to gears 116 and 115 as well as gear 205 beneath the table top. During the stack height adjustment process gear 205 rotates, causing a like pair of gears 207 and 209 to rotate at a like rate and in a like sense due to their interconnection by idler gear 211. Gears 207 and 209 are respectively coupled by way of flexible shafts 213 and 215 to the apparatus of FIGS. 11 and 12 and 9 and 10 respectively, with the other end of shaft 215 being depicted near the bottom of FIG. 10.

During the stack height adjustment, flexible shaft 215 will rotate, driving the toothed pulley 217 which is coupled by way of a toothed belt 219 to a further toothed pulley 221 fixed to the outer sleeve 193 of one of the stator clamping arrangements. Further fixed to that outer sleeve 193 is a second toothed pulley 223 which is coupled by way of a further toothed belt 225 to drive a similar pulley 227 fixed to the corresponding outer sleeve 191. Thus, rotation of the flexible shaft 216 causes the simultaneous rotation of the outer sleeves 191 and 193 and the corresponding increase or decrease in the level of the inner sleeves 187 and 189 in synchronism.

An idler wheel 229 may be supported on arm 231 and spring-loaded to engage belt 225, maintaining the tension on that toothed belt if desired and of course a similar belt tensioning apparatus could be provided for belt 219. The outer sleeve 191 of the pair of coaxial threaded members 191 and 187 may be supported for rotation in bearing 233 with a similar bearing 235 being provided for the other pair of coaxial threaded members. Rotation of cable 215 therefore rotates each of the outer members 191 and 193 and since the inner member of each pair is rotationally fixed by key 195 and 197 respectively, those inner members 187 and 189 move axially in response to such rotation.

As noted earlier, when employing an option of adjusting the stator core clamp stop or the length of insulating wedge provided by the machine in the manner illustrated, it is preferred to disable not only the counter 113 but also the several gears 205, 207, 209 and 211 at all times except during the adjustment process, and employing cylinder 199 in lieu of cylinder 117 readily accomplishes this disablement. Cable 215 provides the desired drive to the stator clamp adjusting arrangement in FIGS. 9 and 10, while cable 213 provides the desired adjustment interconnection for the wedge length adjusting arrangement illustrated in FIGS. 11 and 12.

Figure 11:
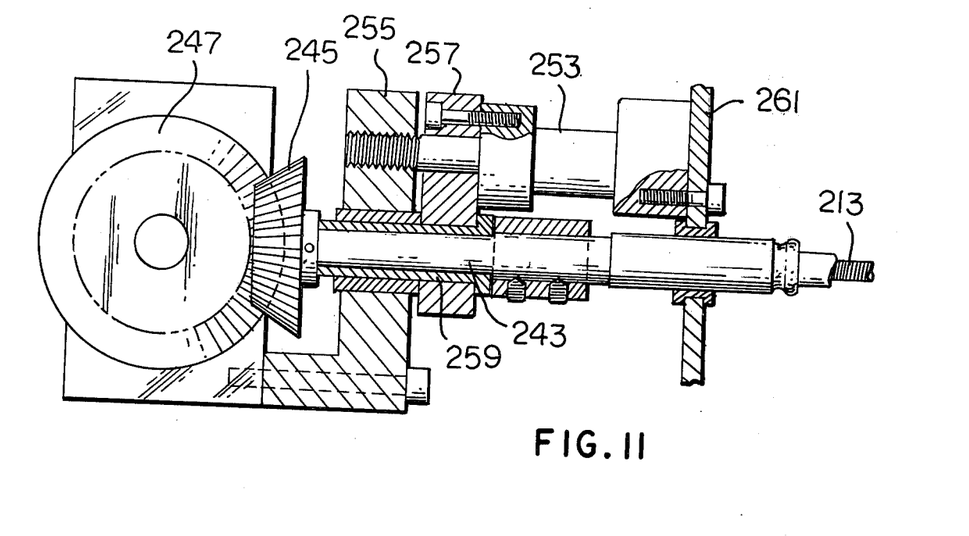
FIGS. 11 and 12 are end and side views respectively of an arrangement for changing insulating wedge length.
Figure 12:
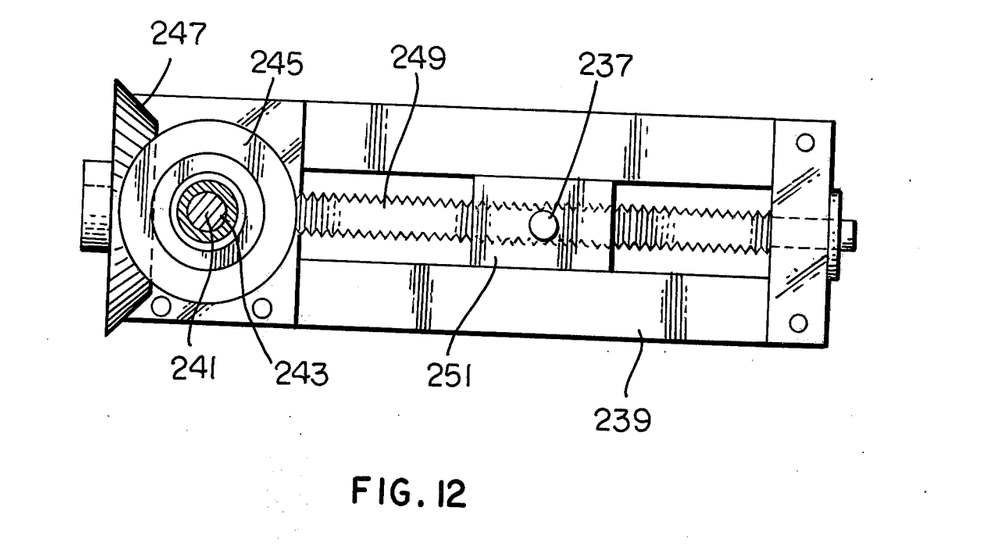

Cable 213 which, like cable 215, is a sheathed flexible drive cable, also rotates only during stack height adjustment, and extends from the gearing arrangement illustrated in FIG. 5 to the arrangement within the coil placing machine for providing strips of insulating material of lengths suitable for forming insulating wedges for placement in the magnetic core, a portion of which is illustrated in FIGS. 11 and 12.

In U.S. Pat. No. 3,694,887 and especially FIG. 4 thereof, there is illustrated a portion of the apparatus for feeding strip insulating material in selectable increments for forming the insulating wedges to later be dispensed from the magazine 35 or 149 and placed in the stator core. The apparatus illustrated in this Patent intermittently feeds the insulating strip material in appropriate lengths as determined by the particular location of a pivot point of a linkage arrangement, with one particular linkage arrangement being illustrated in U.S. Pat. No. 3,659,329. The pivot point of the apparatus is selectively changed between for example, two discrete points for fabricating two distinct length insulating wedges but lacks any adjustment arrangement for easily modifying the feed lengths to accommodate varying stator stack heights. This pivot point corresponds to stud 237 in FIG. 12 with the connecting link of the U.S. Pat. No. 3,659,329 being connected with stud 237, and connecting arm 239 being pivotable about the axis 241 of shaft 243. Cable 213 rotates about this axis 241, driving shaft 243 and a bevel gear 245, which engages a second bevel gear 247 fixed to the threaded shaft 249. Therefore, in the position illustrated in FIGS. 11 and 12, rotation of the sheathed cable 213 induces rotation in threaded shaft 249, driving a correspondingly threaded member 251, which supports stud 237, toward the left or right as viewed in FIG. 12 to vary the pivot point and therefore also the length of wedge fed for each cycle of the apparatus.

During the wedge making process, arm 239 pivots back and forth about axis 241, and the engagement between the pair of bevel gears will cause some change in the location of the pivot point 237 since cable 213 and shaft 243 are held in a fixed position during normal machine operation and in fact are static at all times except during adjustment of the machine for a different stack height. It may therefore be desirable in some instances to disengage the bevel gears 245 and 247 at times other than during stack height adjustment.

This disengagement is accomplished by an air or hydraulic cylinder 253 having the actuating ram or piston thereof threadingly fixed to bracket 255, which is in turn fixed to the arm 239. Actuation of cylinder 253 so as to extend its piston therefore moves collar 257 toward the right as viewed in FIG. 11. Collar 257 engages a flange 259, pulling bevel gear 245 away from engagement with bevel gear 247. The end of air cylinder 253 opposite collar 257 may, if desired, be fixed to a further collar 261 which supports a bearing arrangement for the connection between cable 213 and shaft 243. Air cylinder 253 would be actuated to retract its piston and engage gears 245 and 247 only during stack height adjustment.

In machines not having the stack height adjustment mechanism, one of the bevel gears 245 or 247 may comprise a manual adjustment knob appropriately detented or otherwise prevented from inadvertent movement and rotatable manually to change stroke length and therefore also wedge length as desired.

During the tool indexing and wedge making portion of a machine cycle, the stripper 99 is retracted or lowered to engage the shaft 123 of FIG. 4 (shaft 17 of FIG. 8a) and the clutch or friction arrangement including the clamped together plates 127 and 129 grips the outer threaded shaft 123 to prevent rotation of the blade holder 121 relative to that shaft 123. In other words, for the embodiment illustrated in FIG. 4, and during this tool indexing process, blade holder 121 and threaded shaft 123 should rotate together. It may sometimes happen that screws, such as 125 of FIG. 4, become loosened or for some other reason the blade holder 121 fails to grip the threaded shaft 123 with sufficient force to insure its simultaneous rotation therewith. The provision of a key 263 extending from the stripper portion and engaging a corresponding slot 265 in threaded shaft 17, as illustrated in FIG. 8a (or threaded shaft 123 for the version illustrated in FIG. 4), will insure that no rotation takes place between the blade holder 121, tooling blades, and stripper which rotate together and the threaded shaft 17 or 123. In some situations, the clutch feature of the blade holder 121 may, when the mating key 263 and notch 265 are present, be dispensed with altogether, or the key and clutch feature may complement one another in some installations.

The shafts 175 and 177 of FIG. 10, are of course, out of synchronization with one another to illustrate what happens to the respective parts during the stack height adjustment process. One of the many possible modifications to the structure illustrated in FIG. 10 to achieve a positive limiting stop at both stroke extremes may be rather easily described. For example, if the threaded coupling between sleeves, such as 187 and 191, is replaced by a rotation allowing but relative axial movement preventing connection, the inner sleeve may be fixed to the machine frame and key 195 eliminated. Extending the outer sleeve 191 axially beyond nut 183 would allow a laterally extending stud to be placed on the nut 183 to extend through an axial slot in the extended portion of sleeve 191. With this modified arrangement, when the sleeve 191 is rotated it will engage nut 183, repositioning that nut relative to the threaded shaft 175. Movement of shaft 175 will be limited in its axial direction by the engagement of the stud associated with nut 183 and the respective ends of the slot in sleeve 191.

From the foregoing it is now apparent that a novel coil placing device, as well as a novel system for adapting that device to varying stator sizes, has been disclosed meeting the objects and advantageous features set out hereinbefore as well as others, and that modifications as to the precise configurations, shapes, details and steps of the method may be made by those having ordinary skill in the art without departing from the spirit of the invention or the scope thereof as set out by the claims which follow.

We claim:

1. In a coil placing machine having a plurality of generally parallel upstanding finger elements supported on a shaft and disposed generally in a circular pattern for supporting coils and a magnetic core into which the coils are to be placed, and a reciprocable ram actuated stripper movable along the finger elements to engage and move the coils into the magnetic core, the improvement comprising means effective only in one stripper position for mechanically coupling the finger support shaft and stripper actuating ram together to prevent relative rotation therebetween.

2. The improvement of claim 1 further comprising means for imparting relative rotary motion between the stripper and finger elements on the one hand and the finger support shaft and stripper actuating ram on the other hand when the stripper is in the said one position.

3. The improvement of claim 2 wherein the means for imparting includes a tooling index gear operable when the stripper is in other than the said one position for selectively indexing the stripper and finger elements together about a common center.

4. The improvement of claim 2 wherein the means for imparting includes a gear fixedly attached to and rotatable with the stripper actuating ram.

5. The improvement of claim 2 wherein the stripper and finger elements are maintained in a fixed angular position in the coil placing machine.

6. The improvement of claim 2 wherein the stripper and finger elements may be revolved angularly in the coil placing machine at a predetermined fixed axial position when the stripper is in other than the said one position and the stripper and finger elements may be revolved angularly when the stripper is in the said one position to vary their axial locations in the coil placing machine.

7. The improvement of claim 1 wherein the finger support shaft is disposed in the coil placing machine at a fixed axial location.

8. The improvement of claim 7 further comprising finger holders having the fingers disposed about the periphery thereof and having a generally centrally located aperture threadingly engaging the finger support shaft, relative rotation of the holder and the axially fixed finger support shaft changing the axial extent of the finger elements.

9. The improvement of claim 1 wherein the stripper actuating ram is reciprocable through a fixed length stroke and comprises first and second coaxial members threadingly interengaged, relative rotation of the coaxial members changing the extremes of travel of one ram end while the distance therebetween remains invariant.

10. The improvement of claim 9 further comprising releasable coupling means for interconnecting the ram one end and the stripper to actuate the stripper in response to ram reciprocation between one fixed location and one adjustably variable location.

11. The improvement of claim 10 wherein the coupling means is actuated to disconnect the ram from the stripper when the stripper engages the finger support shaft.

12. The improvement of claim 11 further comprising means for precluding relative rotation between the stripper and the ram first member when the ram and stripper are connected.

13. The improvement of claim 12 further comprising means for rotating the stripper and ram second member relative to the ram first member when the ram and stripper are connected to change the adjustably variable stripper location.

14. The improvement of claim 13 further comprising means for imparting relative rotary motion between the stripper and finger elements on the one hand and the finger support shaft and ram first member on the other hand when the stripper is in the said one position to adapt the coil placing machine to different height magnetic cores.

15. In a coil placing machine having a plurality of generally parallel extending finger elements for supporting coils and a magnetic core into which the coils are to be placed, and a stripper reciprocable along the finger elements to engage and move the coils into the magnetic core, the method of adapting the machine to accommodate magnetic cores of differing sizes comprising the steps of:
    moving the stripper to a retracted position;
    simultaneously rotating the stripper and the plurality of finger elements about a common axis relative to other placing machine parts while maintaining the axial location of the stripper and finger elements fixed;
    moving the stripper to an extended position;

simultaneously rotating the stripper and the plurality of finger elements about the common axis relative to other placing machine parts to increment the axial location of the stripper and finger elements in unison relative to the other placing machine parts.

16. In a coil placing machine having a plurality of generally parallel extending finger elements for supporting coils and a magnetic core into which the coils are to be placed, and a stripper reciprocable along the finger elements to engage and move the coils into the magnetic core, the method of adapting the machine to accommodate magnetic cores of differing sizes comprising the steps of:

moving the stripper to an extended position;
simultaneously drivingly engaging a first stripper actuating member and a finger element support shaft for imparting thereto simultaneous rotary motion, the stripper being threadingly coupled to the first actuating member and the finger elements being threadingly coupled to the support shaft; and
maintaining the finger elements and stripper in a fixed angular position to impart simultaneous axial motion thereto.

17. In a coil placing machine having a plurality of generally parallel upstanding finger elements supported on a shaft for in turn supporting coils and a magnetic core into which the coils are to be placed, and a reciprocable ram actuated stripper movable along the finger elements to engage and move the coils into the magnetic core, the method of adapting the machine to accommodate various magnetic core sizes comprising:

axially extending the ram and stripper to interlock the ram and the finger support shaft to prevent relative rotation therebetween;
imparting relative angular movement between the ram and finger support shaft on the one hand and the stripper and finger elements on the other hand to axially displace the stripper and the finger elements.

18. The method of claim 17 wherein the coil placing machine includes a reciprocable arrangement for releasably clamping the magnetic core in position to receive coils, the method of adapting further including modifying at least one of the extremes of reciprocation of the clamping arrangement in conformity with the axial displacement imparted to the stripper and finger elements.

19. The method of claim 17 wherein the coil placing machine includes an arrangement for providing strips of insulating material of lengths suitable for forming insulating wedges for the magnetic core, the method of adapting further including varying the length of the formed strips in conformity with the axial displacement imparted to the stripper and finger elements.

20. The method of claim 19 wherein the coil placing machine includes a reciprocable arrangement for releasably clamping the magnetic core in position to receive coils, the method of adapting further including modifying at least one of the extremes of reciprocation of the clamping arrangement in conformity with the axial displacement imparted to the stripper and finger elements.

21. The improvement of claim 2 wherein the coil placing machine includes an arrangement for providing strips of insulating material of lengths suitable for forming insulating wedges for placement in the magnetic core, and further comprising means rotatable in unison with the said relative rotary motion for changing the length of the wedges formed.

22. The improvement of claim 2 wherein the coil placing machine includes a reciprocable arrangement for releasably clamping the magnetic core in position to receive coils, and further comprising means rotatable in unison with the said relative rotary motion for modifying at least one of the extremes of reciprocation of the clamping arrangement.

23. The improvement of claim 22 wherein the coil placing machine further includes an arrangement for providing strips of insulating material of lengths suitable for forming insulating wedges for placement in the magnetic core, and further comprising means rotatable in unison with the said relative rotary motion for changing the length of the wedges formed.

24. The improvement of claim 23 wherein each said means rotatable in unison includes a sheathed flexible drive cable.

25. The improvement of claim 22 wherein the arrangement for releasably clamping includes pairs of coaxial threaded members with one member of each pair being supported for rotation by said rotatable means and the other member of each pair being rotationally fixed and axially movable in response to such rotation.

26. The improvement of claim 1 further comprising means for precluding relative rotation between the stripper and the finger support shaft effective only when the stripper is in other than the said one position.

* * * * *

UNITED STATES PATENT AND TRADEMARK OFFICE
CERTIFICATE OF CORRECTION

PATENT NO. : 4,156,964

DATED : June 5, 1979

INVENTOR(S) : Robert G. Walker et al.

It is certified that error appears in the above—identified patent and that said Letters Patent is hereby corrected as shown below:

The break lines in Fig. 1 should continue across portions 65 and 67 as shown below:

FIG. 1

Signed and Sealed this

Thirteenth Day of October 1981

[SEAL]

Attest:

Attesting Officer

GERALD J. MOSSINGHOFF

Commissioner of Patents and Trademarks